(12) United States Patent
Saunders et al.

(10) Patent No.: US 12,436,519 B2
(45) Date of Patent: Oct. 7, 2025

(54) GENERATING CONFORMAL STRUCTURES FOR 3D OBJECT MODELS

(71) Applicant: Peridot Print LLC, Palo Alto, CA (US)

(72) Inventors: Nicholas Saunders, Vancouver, WA (US); David Woodlock, Vancouver, WA (US); James McCutcheon, Vancouver, WA (US)

(73) Assignee: Peridot Print LLC, Palo Alo (CA)

( * ) Notice: Subject to any disclaimer, the term of this patent is extended or adjusted under 35 U.S.C. 154(b) by 90 days.

(21) Appl. No.: 18/032,289

(22) PCT Filed: Oct. 28, 2020

(86) PCT No.: PCT/US2020/057758
§ 371 (c)(1),
(2) Date: Apr. 17, 2023

(87) PCT Pub. No.: WO2022/093216
PCT Pub. Date: May 5, 2022

(65) Prior Publication Data
US 2023/0400834 A1 Dec. 14, 2023

(51) Int. Cl.
*G06F 7/48* (2006.01)
*B22F 10/30* (2021.01)
(Continued)

(52) U.S. Cl.
CPC .......... *G05B 19/4099* (2013.01); *B22F 10/30* (2021.01); *B28B 1/001* (2013.01);
(Continued)

(58) Field of Classification Search
CPC ....... B22F 10/30; B28B 1/001; B29C 64/165; B29C 64/386; B29D 99/0089;
(Continued)

(56) References Cited

U.S. PATENT DOCUMENTS 9,486,672 B2 11/2016 Kim
10,700,438 B2 6/2020 Gerding
(Continued)

FOREIGN PATENT DOCUMENTS

CN 109377561 A 2/2019
EP 3476570 A1 5/2019
(Continued)

OTHER PUBLICATIONS

Ye et al. (Topology optimization of conformal structures on manifolds using extended level set methods (X-LSM) and conformal geometry theory), Computer Methods in Applied Mechanics and Engineering, vol. 344, Feb. 1, 2019, pp. 164-185 (Year: 2019).*

*Primary Examiner* — Nithya J. Moll
(74) *Attorney, Agent, or Firm* — Michael Dryja

(57) ABSTRACT

In an example implementation, a method of generating a conformal structure, includes generating a bottom surface and a top surface of a conformal structure, positioning seed points on a seed surface, where the seed surface comprises the bottom surface or the top surface, and expanding the seed points as spherical cells whose cell boundaries form walls perpendicular to the surfaces as the cell boundaries intersect with cell boundaries of neighboring spherical cells. The method includes intersecting the walls with the top surface as the cells expand vertically upward from the seed surface and intersecting the walls with the bottom surface as the cells expand vertically downward from the seed surface, and applying the conformal structure to a 3D object model for fabrication in an additive manufacturing device.

14 Claims, 6 Drawing Sheets

(51) Int. Cl.
*B28B 1/00* (2006.01)
*B29C 64/386* (2017.01)
*B33Y 10/00* (2015.01)
*B33Y 50/00* (2015.01)
*B33Y 80/00* (2015.01)
*G05B 19/4099* (2006.01)
*B29C 64/165* (2017.01)
*B29D 99/00* (2010.01)
*B29L 31/60* (2006.01)

(52) U.S. Cl.
CPC ............ *B29C 64/386* (2017.08); *B33Y 10/00* (2014.12); *B33Y 50/00* (2014.12); *B33Y 80/00* (2014.12); *B29C 64/165* (2017.08); *B29D 99/0089* (2013.01); *B29L 2031/608* (2013.01)

(58) Field of Classification Search
CPC ... B29L 2031/608; B33Y 10/00; B33Y 50/00; B33Y 80/00; G05B 19/4099; G06T 17/00
See application file for complete search history.

(56) References Cited

U.S. PATENT DOCUMENTS

| | | |
|---|---|---|
| 2006/0013505 A1 | 1/2006 | Yau et al. |
| 2013/0305435 A1 | 11/2013 | Surabhi |
| 2017/0165910 A1 | 6/2017 | Dinardo |
| 2018/0027914 A1 | 2/2018 | Cook |
| 2021/0206135 A1* | 7/2021 | Webb .................. B29D 99/0089 |
| 2021/0354366 A1* | 11/2021 | Sajadi ................... C04B 41/009 |
| 2021/0370606 A1* | 12/2021 | Kim ....................... B29C 64/386 |

FOREIGN PATENT DOCUMENTS

| | | |
|---|---|---|
| WO | 2019/083362 A1 | 5/2019 |
| WO | 2019/166806 A1 | 9/2019 |

* cited by examiner

GENERATING CONFORMAL STRUCTURES FOR 3D OBJECT MODELS

BACKGROUND

Additive manufacturing processes can produce three-dimensional (3D) objects by providing a layer-by-layer accumulation and selective treatment of the build material layers according to digital 3D object models. Data from a digital 3D object model can be processed into slices that define areas of each build material layer that are to be formed into an object. An object can be formed when the defined areas of build material are solidified according to the 3D object model. For example, in some 3D printing devices, inkjet printheads can selectively print (i.e., deposit) liquid functional agents, such as fusing agents or liquid binding agents, onto defined areas of build material within each build layer that are to become a layer of a 3D object. Energy can be applied to each build layer and the printed areas of build material can coalesce and solidify upon cooling.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Figure 1:
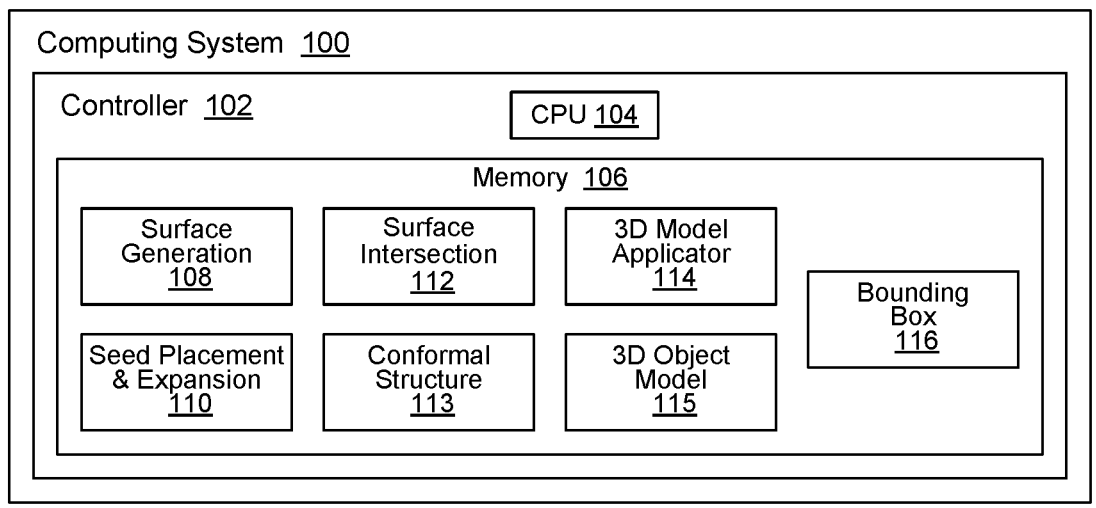
FIG. 1 shows a block diagram of an example computing system suitable for generating a conformal structure.

In some additive manufacturing processes, including some 3D printing processes, 3D objects can be formed from layers of build material according to digital 3D object models. Examples of different build materials include plastics, metals, and ceramic materials that can be used in different forms such as powders, fibers, and so on. In some example processes, layers of build material are spread over a build platform one layer at a time, and portions of each material layer are combined with portions of a subsequent layer until a 3D object is fully formed. In some examples, a liquid agent such as a fusing agent can be printed or deposited onto portions of each material layer, and heat or other types of energy, such as ultra-violet light, can be applied to facilitate the solidification of the printed build material.

A 3D object model is a digital file that represents an object to be fabricated in an additive manufacturing process such as a 3D printing process. A 3D object model can be generated, for example, using 3D CAD (computer aided design) software, or through 3D scanning. Different CAD software programs often have their own proprietary 3D file formats optimized for the particular CAD software. Thus, there are many different 3D file formats with varying capabilities for storing and/or encoding object parameters and characteristics ranging, for example, from basic object geometries to detailed variations in object features related to materials, colors, strengths, flexibilities, textures, and so on. Some of these 3D file formats include, for example, STL, OBJ, COLLADA, and 3MF.

Additive manufacturing processes can enable the fabrication of complex geometries in objects that might otherwise be impossible or too costly to fabricate using manufacturing processes such as milling or casting. Examples of such complex geometries can include conformal structures, 3D structures having cavities or undercuts, and so on. A conformal structure is a structure in which structural elements, such as beams or walls, maintain a normal (i.e., perpendicular) orientation with respect to a curved surface from which they emanate and/or to which they extend. These "normal" structural elements have the greatest strength when they are loaded in-line, or on-axis. When these structural elements are loaded off-axis (i.e., at an angle), the rotational moment arm is increased, and bending of the elements can occur at lower applied forces. Therefore, in some impact applications, such as in safety helmet applications, in order to maximize protection against an impact, the geometry of the structural elements within a conformal structure should be adjusted to provide the same normal orientation in every direction when covering a curved area. A honeycomb structure is an example of such a structural element that has high strength when loaded or impacted in a direction in line with its top and/or bottom openings as compared with its strength when loaded or impacted at the sides of the structure. Additive manufacturing processes such as 3D printing processes are capable of fabricating such normally oriented elements within conformal structures.

In general, any shape that can be generated as a 3D object model using a 3D CAD program, can be fabricated in an additive manufacturing process such as a 3D printing process. However, the converse is not always true. That is, some geometries that can be envisioned and readily fabricated in an additive manufacturing process, may not be possible to generate as a 3D object model using a 3D CAD program. A conformal structure is one example of a complex geometry that cannot always be generated as a 3D object model in some 3D CAD programs. Thus, some 3D CAD programs can have limitations when it comes to generating 3D object models for some complex geometries, such as conformal structures.

Accordingly, example methods and devices described herein enable the generation of conformal structures that can be applied to 3D object models to be used for fabricating 3D objects in an additive manufacturing device. The example methods and devices enable the generation of continuous structural elements that are normal to curved surfaces. A conformal structure can include a bottom or inner curved surface, and a corresponding top or outer curved surface. Seed points can be positioned in a predetermined orientation across a curved seed surface. The curved seed surface can be the bottom surface or the top surface. In some examples, an average or middle surface interpolated between the bottom and top surfaces can be generated and used as the curved seed surface.

The seed points positioned on the seed surface can grow as spheres. The sphere boundaries can expand outwardly in all directions. As the sphere boundaries expand in a generally horizontal direction, across and more parallel to the curved seed surface, they intersect with expanding boundaries of neighboring spheres. The intersection of expanding sphere boundaries forms walls that are perpendicular to both the seed surface and to the bottom and top surfaces. The sphere boundaries can also continue expanding upward and downward in a vertical direction perpendicular to the curved seed surface. As the expanding boundaries from neighboring spheres intersect with one another and continue expanding vertically, the perpendicular walls formed by the intersecting boundaries create tubes that are also perpendicular to the surfaces. The tubes extend vertically (upward and downward) from the seed surface and they can grow indefinitely in vertical space. In some examples, a bounding box can be used to confine the growth of the tube structures.

Based on the initial positioning of the seed points on the seed surface, the shapes of the tubes can be controlled to form particular structures such as honeycomb structures. In addition to being confined within a bounding box, the tube structures (e.g., honeycomb structures) can be intersected on the top side by the top curved surface, and on the bottom side by the bottom curved surface. The intersection of these honeycomb structures on the top side by the top curved surface, and on the bottom side by the bottom curved surface, creates line patterns on those surfaces, such as hexagonal line patterns in the case of the honeycomb structures. The line patterns on the bottom and top surfaces are interconnected by the perpendicular walls extending between the surfaces. The intersection, and interconnection, of the bottom and top curved surfaces with the tube structures (e.g., honeycomb structure or other structure), forms the conformal structure that comprises internal structural elements that are normal to the curved surfaces. These internal structural elements include the tube structures as well as the perpendicular walls that make up the tube structures. The width of the walls within the conformal structure can be offset (i.e., increased) to increase the strength of a 3D object that is to be formed based on the conformal structure. The conformal structure generated in this manner can then be applied to a 3D object model to be used in an additive manufacturing device such as a 3D printer to fabricate an object, such as a safety helmet, knee pads, elbow pads, and other protective gear.

In a particular example, a method of generating a conformal structure includes generating a bottom (i.e., inner) surface and a top (i.e., outer) surface of a conformal structure, and positioning seed points on a seed surface. The seed surface can comprise the bottom surface or the top surface. In some examples, an average (i.e., middle) surface can be generated as the seed surface. An average surface can correspond with the bottom and top surfaces and be interpolated between the bottom and top surfaces. The method includes expanding the seed points as spherical cells whose cell boundaries form walls perpendicular to the surfaces as they intersect with the expanding boundaries of neighboring cells. The method includes intersecting the walls with the top surface at the top side of the cell that expand vertically outward (i.e., upward) from the seed surface, and with the bottom surface at the bottom side of the cells that expand vertically inward (i.e., downward) from the seed surface. In some examples, portions of the walls that extend beyond the bottom and top surfaces can be removed, whereby the bottom surface, top surface, and remaining portions of the walls in between the bottom and top surfaces comprise the conformal structure. The method can also include applying the conformal structure to a 3D object model for fabrication in an additive manufacturing device.

In another example, a system for generating a conformal structure comprises a memory having modules with instructions that are executable on a processor for generating a conformal structure. The system further comprises a processor programmed with instructions from, a surface generation module to generate bottom and top surfaces, a seed module to place and expand seed points across a seed surface, an intersection module to intersect structures formed by expanded seed points with the bottom and top surfaces, and an applicator module to incorporate the conformal structure into a 3D object model. The system also comprises a print engine to use the 3D object model to fabricate a 3D object that includes the conformal structure.

In another example, a non-transitory processor-readable medium stores code representing instructions that when executed by a processor causes the processor to generate an inner surface and an outer surface of a conformal structure, generate a middle surface between the inner surface and the outer surface, and seed the middle surface with seed points according to a predetermined pattern. The instructions can further cause the processor to expand the seed points into spheres that form walls from intersecting sphere boundaries, and to intersect the walls on a top side with the outer surface and on a bottom side with the inner surface, thereby forming the conformal structure.

Figure 2:
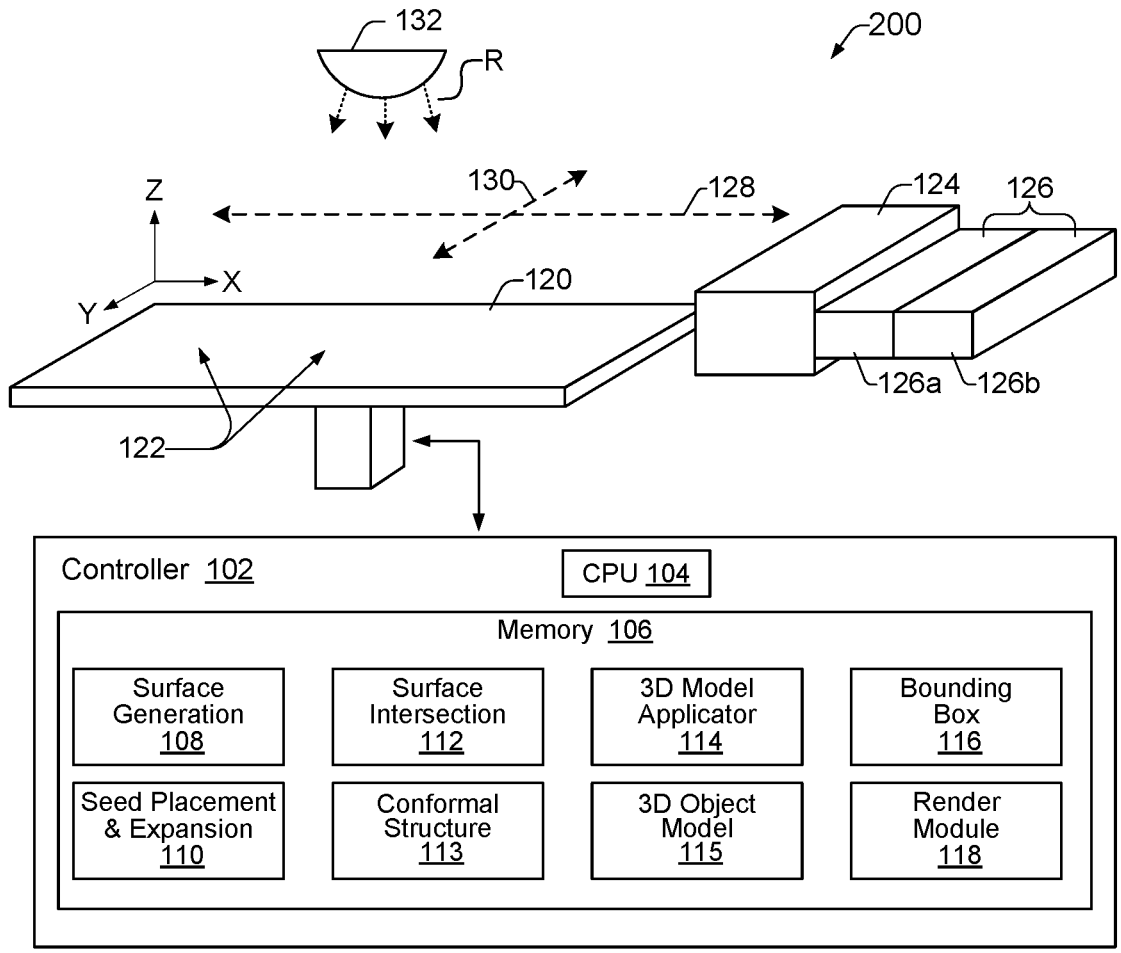
FIG. 2 shows a block diagram of an example additive manufacturing device that is also suitable for generating a conformal structure.

FIG. 1 shows a block diagram of a computing system 100 suitable for generating a conformal structure that can be applied to a 3D object model to be used in an additive manufacturing device to fabricate an object incorporating the conformal structure. FIG. 2 shows a block diagram of an example additive manufacturing device implemented as 3D printing system 200 that is also suitable for generating such a conformal structure. The 3D printing system 200 is further suitable for fabricating an object from a 3D object model incorporating such a conformal structure, both when the conformal structure and 3D object model are generated on the 3D printing system 200 itself, and when the conformal structure and 3D object model are generated on and received from a remote device such as an external computing device, including a computing system 100, a CAD system, or the like. In general, the operations performed to generate a conformal structure can be implemented on any system or device equipped with suitable processing capability as will be discussed with respect to the systems of FIGS. 1 and 2. Such systems and devices can include, but are not limited to, various types of computers, CAD systems, additive manufacturing systems, 3D printing systems, and so on.

Referring to FIGS. 1 and 2, in order to avoid duplicating portions of this description, like components that perform the same operations or tasks within computing system 100 and 3D printing system 200 are referred to in FIGS. 1 and 2 using the same reference numerals. Thus, the discussion herein of such like components applies similarly to the components in both the computer system 100 and 3D printing system 200. As shown in FIGS. 1 and 2, systems 100 and 200 can include an example controller 102. The controller 102 can control various operations of respective systems 100 and 200 to facilitate, for example, the generation of a conformal structure as discussed herein.

An example controller 102 can include a processor (CPU) 104 and a memory 106. The controller 102 may additionally include other electronics (not shown) for communicating with and controlling various components and operations within a system such as computing system 100 and 3D printing system 200. Such other electronics can include, for example, discrete electronic components and/or an ASIC (application specific integrated circuit). Memory 106 can include both volatile (i.e., RAM) and nonvolatile memory components (e.g., ROM, hard disk, optical disc, CD-ROM, flash memory, etc.). The components of memory 106 comprise non-transitory, machine-readable (e.g., computer/processor-readable) media that can provide for the storage of machine-readable coded program instructions, data structures, program instruction modules, JDF (job definition format), plain text or binary data in various 3D file formats such as STL, VRML, OBJ, FBX, COLLADA, 3MF, and other data and/or instructions executable by a processor 104 of a system such as computing system 100 and 3D printing system 200.

As shown in the example controller 102 of FIGS. 1 and 2, an example of executable instructions and/or data to be stored in memory 106 include program instructions and/or data associated with modules comprising a surface generation module 108, a seed placement and expansion module 110, a surface intersection module 112, a conformal structure 113, a 3D model applicator module 114, a 3D object model 115, and a bounding box module 116.

A surface generation module 108 can generate surfaces of a structure, such as the bottom (i.e., inner) and top (i.e., outer) surfaces of a conformal structure. In some examples, the surface generation module 108 can generate surfaces that correspond to bottom and top surfaces, such as an intermediate surface positioned between a bottom and top surface, or an exterior surface positioned below a bottom surface or above a top surface.

A seed placement and expansion module 110 can position seed points onto a surface at locations that are predetermined to provide a particular type of structure upon expansion of the seed points. For example, seed points can be positioned on a surface so that their expansion into growing spheres produces honeycomb structures as the boundaries of the expanding spheres intersect with one another. Positioning seed points onto a surface can include controlling their orientation and distance with respect to one another on the surface such that the expanding sphere boundaries intersect one another at different angles that produce different predetermined structural shapes.

A surface intersection module 112 can cause the intersection of surfaces, such as a bottom and top surface, with the structures formed by the expansion of the seed points. Intersecting the surfaces with the structures forms a conformal structure 113 that can have a curved bottom surface and corresponding curved top surface with intermediate structural elements, such as beams or walls that form comprehensive structures (e.g., a honeycomb structure), where the structural elements have a normal (i.e., perpendicular) orientation to both the bottom and top surfaces.

A 3D model applicator module 114 can apply the conformal structure 113 to a 3D object model such that the resulting 3D object model 115 incorporates the conformal structure 113. For example, if a 3D object model comprises a model of a safety helmet, the 3D model applicator module 114 can apply the conformal structure 113 to the model so that the resulting 3D object model 115 comprises the conformal structure with internal structures that have a normal orientation to the bottom and top surfaces of the safety helmet.

A bounding box module 116 can operate to place a boundary around the generated surfaces and the expanding seed points to limit or confine the processing used for the expansion of the seed points and the structures being formed from the expanding seed points. Thus, the growth of the expanding seed points, as well as the resultant growth of the internal structures defined by the intersecting sphere boundaries from the growing seed points can be confined within the bounding box instead of extending indefinitely in a vertical direction away from the bottom and top surfaces of the conformal structure.

Instructions in these modules when executed by a processor 104 can cause a system such as computing system 100 and 3D printing system 200 to generate a conformal structure 113 that can be applied to a 3D object model 115 which can then be used in an additive manufacturing device to fabricate an object incorporating the conformal structure. Such an additive manufacturing device can include, for example, the 3D printing system 200 of FIG. 2.

Figure 3:
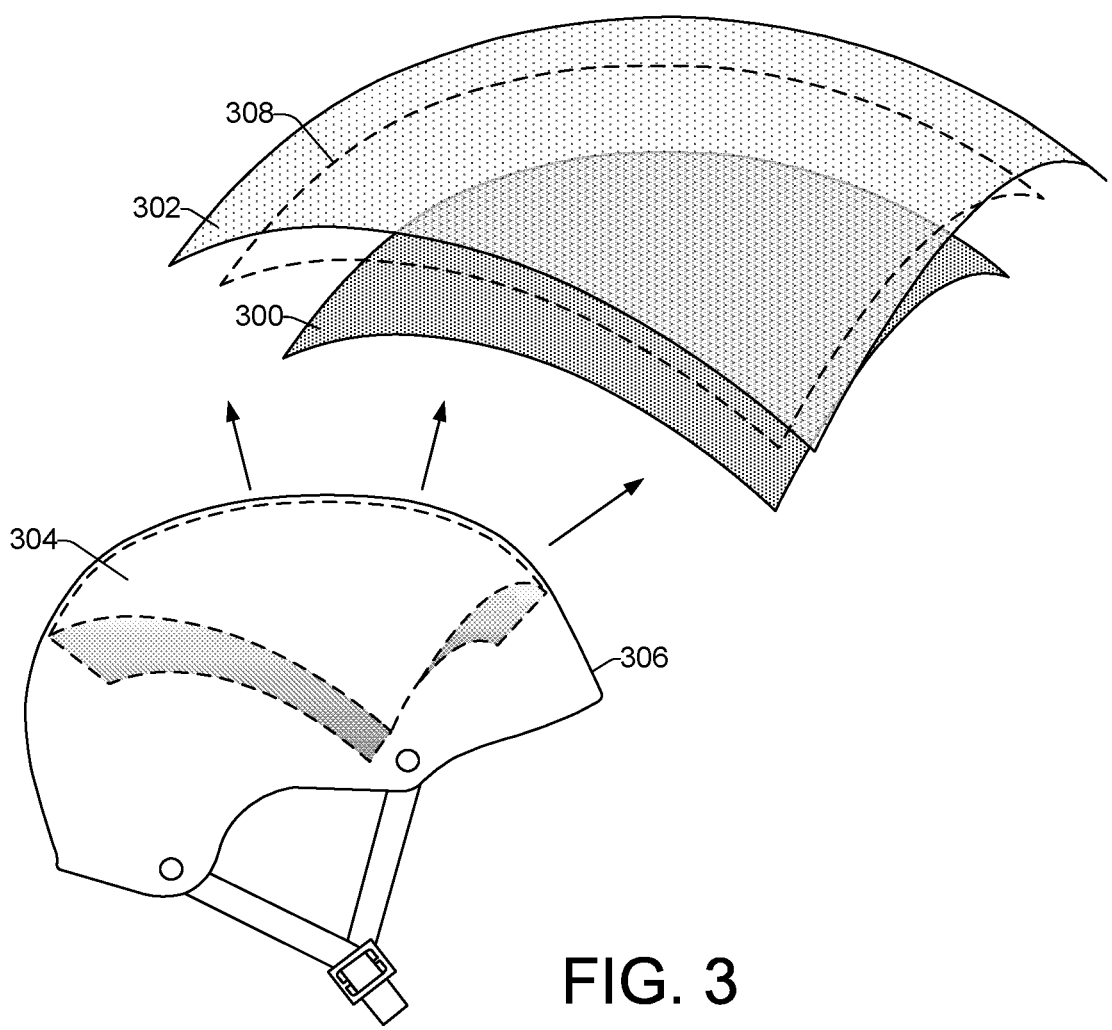
FIG. 3 shows examples of a physical conformal structure, curved surfaces that make up bottom and top surfaces of the conformal structure, and a safety helmet.

FIG. 3 shows an example of a physical conformal structure 304, curved surfaces that make up bottom and top surfaces of the conformal structure, and a safety helmet 306 as a suitable object for implementing a conformal structure 304. The conformal structure 304 includes a bottom curved surface 300 and a top curved surface 302. The bottom surface 300 and top surface 302 can be generated by a system such as computing system 100 or a 3D printing system 200 executing instructions from a surface generation module 108 on a processor 104 of controller 102. The bottom surface 300 and top surface 302 comprise digital representations of surfaces of a physical conformal structure 304 to be fabricated, such as the curved portion 304 of a safety helmet 306, for example, as shown in FIG. 3. In FIG. 3, the top surface 302 is shown in a partial transparent view in order to facilitate viewing of the underlying bottom surface 300. Also shown in FIG. 3, is an average or intermediate surface 308 (shown in dashed lines) that can be interpolated between the bottom surface 300 and top surface 302. The intermediate surface 308 can also be generated by execution of instructions from surface generation module 108.

Figure 4:
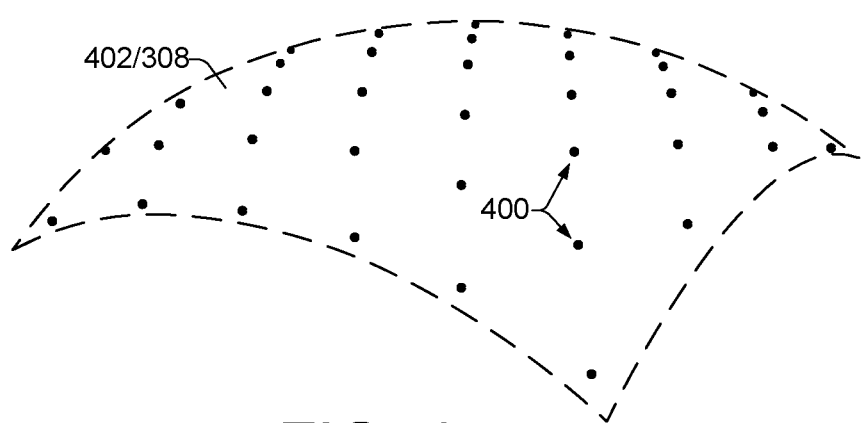
FIG. 4 shows an example of seed points 400 positioned onto a seed surface.

FIG. 4 shows an example of seed points 400 positioned onto a seed surface 402. The seed surface can be implemented as one of the bottom surface 300, the top surface 302, or the intermediate surface 308, shown in FIG. 3. While the seed points 400 can be positioned on any one of the surfaces, they are shown in FIG. 4 positioned onto the intermediate surface 308 in order to help convey how a process of expanding the seed points 400 can occur to form structural elements between the bottom surface 300 and the top surface 302. Execution on processor 104 of instructions from the seed placement and expansion module 110 can determine an ordered location of seed points 400 onto the seed surface 402/308 that will result in the growth and formation of desired structures between the bottom surface 300 and top surface 302.

Figure 5A:
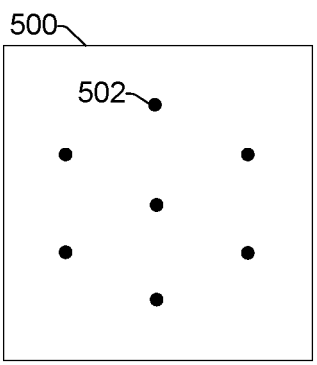
FIGS. 5a, 5b, and 5c, show an example of a simplified two-dimensional (2D) seed surface and seed point growth in an overhead or top-down view.
Figure 5B:
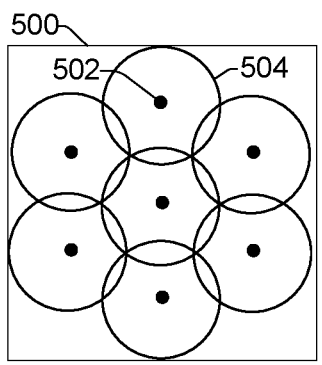
Figure 5C:
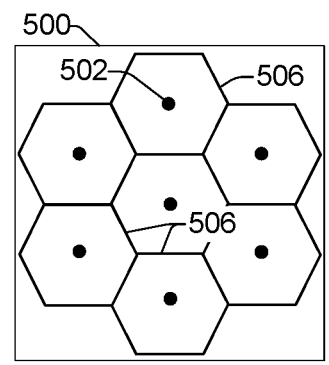

After placement of the seed points 400 in a predetermined orientation relative to one another across the curved seed surface 402, further execution of instructions from module 110 can grow the boundaries of the seed points 400 to form expanding 3D spheres. To help illustrate the growth of seed points into expanding spheres that form structures, FIGS. 5a, 5b, and 5c, show a simplified two-dimensional (2D) example of seed point growth in an overhead or top-down view. In FIG. 5*a*, an example 2D seed surface 500 is shown with seed points 502 placed in a predetermined orientation. In this example, the flat 2D seed surface 500 in FIG. 5*a* is analogous to the curved 3D seed surfaces 308 and 402 in FIGS. 3 and 4, respectively.

Referring to FIG. 5*b*, the seed points 502 can grow into spheres 504, whose boundaries continue expanding. While the boundaries of the spheres 504 in the 2D example view of FIG. 5*b* are shown expanding horizontally across the 2D surface 500, the sphere boundaries also continue to expand outwardly in all directions. Thus, in FIG. 5*b*, the sphere boundaries also expand vertically in directions that are both toward the viewer and away from the viewer. As the spheres continue growing, their expansion toward one another in a generally horizontal direction across or generally parallel to the seed surface 500, the sphere boundaries intersect with the expanding boundaries of neighboring spheres.

As shown in FIG. 5*c*, the intersection of expanding sphere boundaries defines walls 506. The walls 506 are perpendicular to the flat, 2D seed surface 500, and they extend vertically toward and away from the viewer of FIG. 5*c*. In a 3D example such as with the curved 3D surface 402, walls that form from the intersection of expanding sphere boundaries are likewise perpendicular to (i.e., normal to) the curved seed surface 402. Furthermore, referring to FIG. 6*a* and again back to FIG. 3, when the walls form perpendicular (i.e., normal) to a curved seed surface 308 by the intersections of expanding sphere boundaries, the walls are also formed perpendicular to the bottom surface 300 and top surface 302 which correspond with the seed surface 308.

Figure 6A:
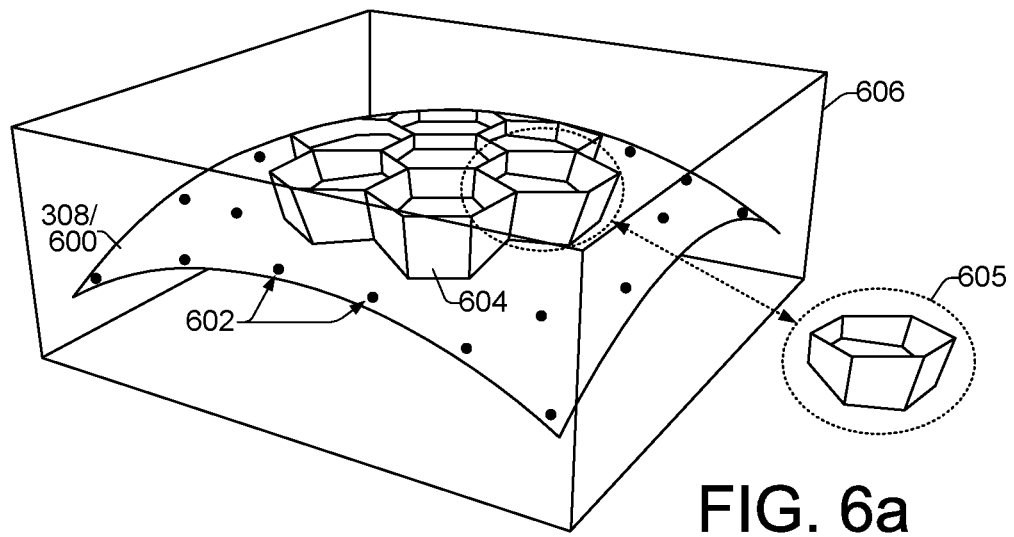
FIG. 6a shows an example of a curved intermediate surface.

FIG. 6*a* shows an example of a curved intermediate surface, such as intermediate surface 308 from FIG. 3, implemented as a seed surface 600. In FIG. 6*a*, examples of seed points 602 are also shown positioned on the seed surface 600, along with some examples of structural walls 604 that would form perpendicular to the seed surface 600 as the example seed points 602 grow into spheres whose boundaries intersect one another, as discussed above. The example shown in FIG. 6*a* is not intended to be complete, but is instead intended to help illustrate how example seed points 602 placed in a particular predetermined orientation on a seed surface 600 can be expanded as spheres to intersect one another and form walls 604, which in turn form tubular structures 605 (e.g., honeycomb structures) that extend perpendicular to and vertically between bottom and top curved surfaces (e.g., surfaces 300, 302, FIG. 3) of a conformal structure. FIG. 6*a* is also intended to show that the walls 604 and tubular structures 605 can extend indefinitely in vertical upward and downward directions. Accordingly, in some examples the expansion of the walls 604 and tubular structures 605 can be limited by the placement of a bounding box 606 around the seed surface 600, as shown in FIG. 6*a*.

Figure 6B:
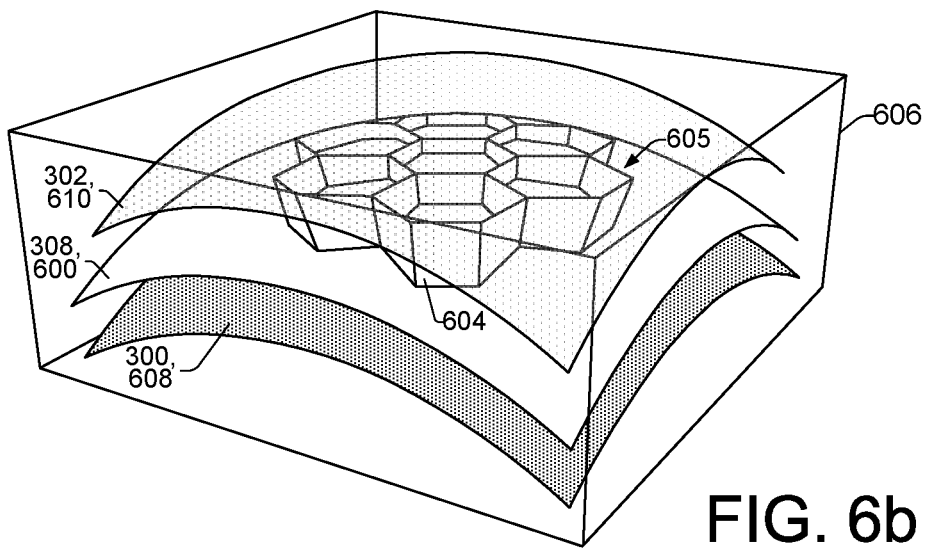
FIG. 6b shows an example intersection of the walls and/or tubular structures with a bottom surface and a top surface.

FIG. 6*b* shows the intersection of the walls 604 and/or tubular structures 605 with a bottom surface 608 and a top surface 610, such as the bottom surface 300 and top surface 302 generated by the execution of instructions from a surface generation module 108 (FIGS. 1 and 2). Referring again to FIGS. 1 and 2, the execution of instructions from a surface intersection module 112 can cause a processor 104 of a system such as computing system 100 or 3D printing system 200 to intersect the walls 604 and/or tubular structures 605 with a bottom surface 608 and a top surface 610. The surface intersection module 112 can further remove portions of the walls 604 and/or tubular structures 605 that extend beyond the intersecting bottom surface 608 and intersecting top surface 610.

Figure 7A:
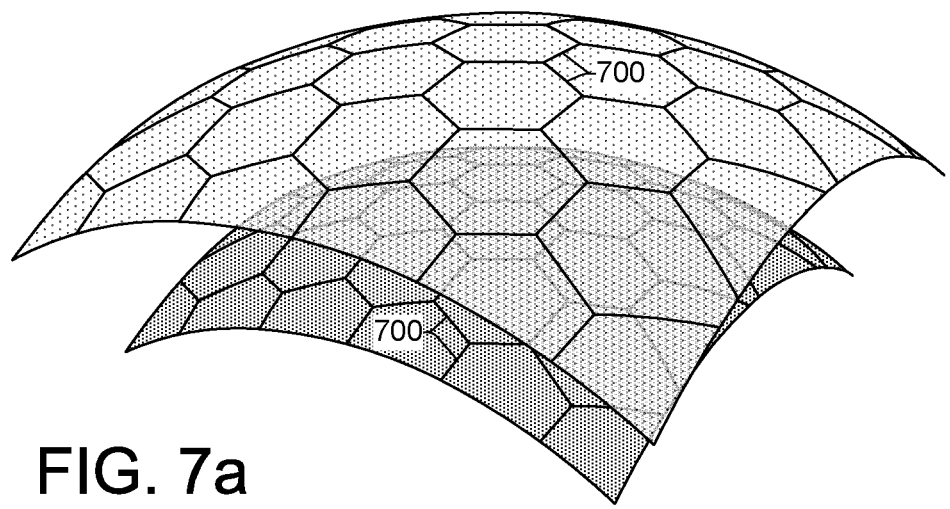
FIG. 7a shows an example of a bottom surface and a top surface after intersecting the surfaces with walls and/or tubular structures.

FIG. 7*a* shows an example of the bottom surface 608 and a top surface 610 of FIG. 6*b* after intersecting the surfaces with the walls 604 and/or tubular structures 605, and after removal of portions of the walls 604 and/or tubular structures 605 that extend beyond the intersecting bottom surface 608 and intersecting top surface 610. The intersection of the surfaces can create line patterns 700 over the curved surfaces 608, 610, that correspond with the shape of the tubular structures 605 (not shown in FIG. 7*a*). In this example, the line patterns form hexagonal line patterns 700 that correspond with the top and bottom cross sections of the honeycomb shaped tubular structures 605. As indicated above, the placement or orientation of the seed points onto the seed surface as determined by execution of the placement and expansion module 110 can result in the formation of different patterns as the seed points expand and their expanding boundaries intersect to form walls. The number and types of the patterns and shapes that can be generated by varying the placement of seed points onto the seed surface is virtually infinite.

Figure 7B:
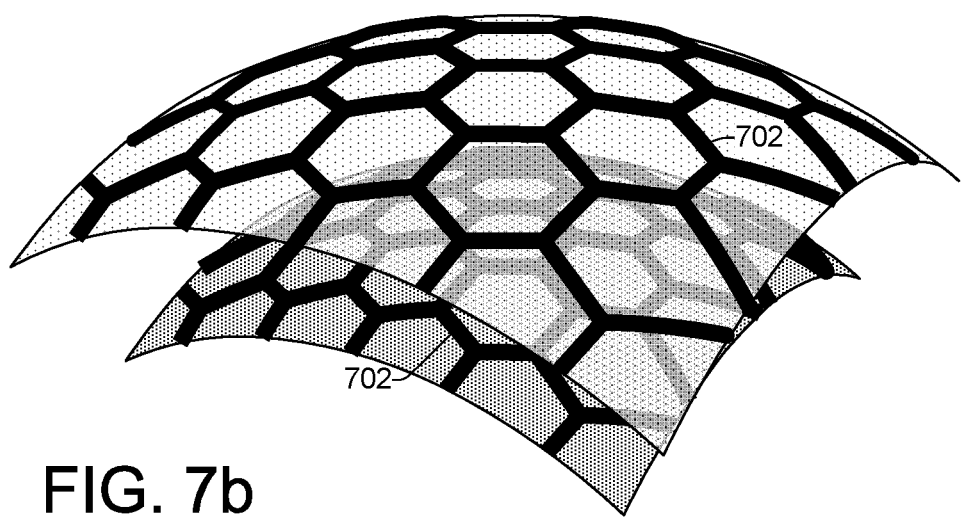
FIG. 7b shows an example of bottom surface and top surface line patterns and corresponding walls that have been offset to form thicker line patterns and walls.

FIG. 7*b* shows an example of the bottom surface 608 and a top surface 610 of FIG. 6*b* in which the line patterns 700 and corresponding walls 604 (not shown in FIG. 7*b*) have been offset to form thicker line patterns 702 and walls. Execution of additional instructions from surface intersection module 112, for example, can cause an increase in the width of the line patterns 700 and corresponding walls 604 that extend between the bottom surface 608 and a top surface 610. Offsetting the lines and walls to provide additional width can increase the strength of a resulting 3D object that is to be formed from a 3D object model that incorporates or is based on the conformal structure.

Figure 7C:
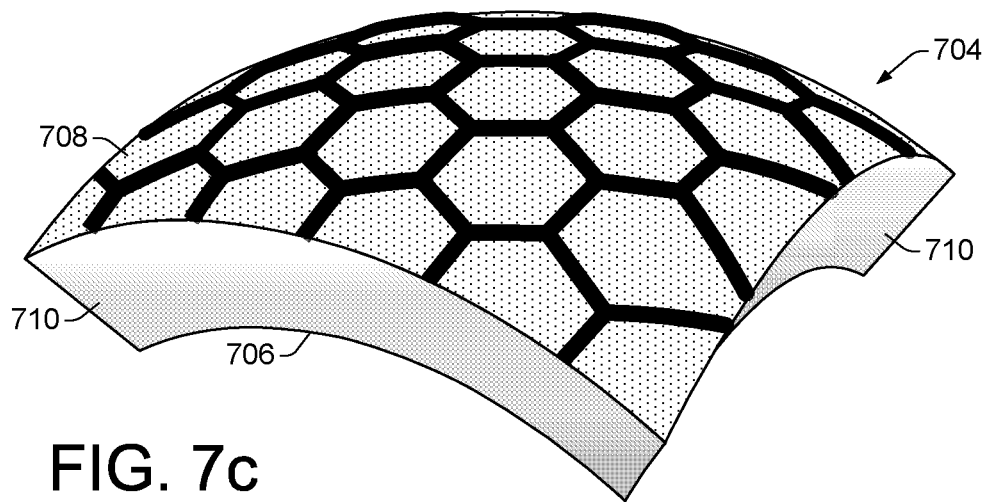
FIG. 7c shows an example of a conformal structure.

FIG. 7*c* shows an example of a conformal structure 704. Conformal structure 704 can comprise a digital representation such as a conformal structure 113 (FIGS. 1 and 2) generated by a system such as computing system 100 or 3D printing system 200. Thus, conformal structure 704 comprises a bottom surface 706, a top surface 708, and internal conformal structures 710 (not specifically illustrated in FIG. 7*c*) such as walls and tubular structures that are formed perpendicular, or normal, to the bottom surface 706 and top surface 708. In this respect, referring again to FIGS. 1 and 2, by execution of instructions in a 3D model applicator 114, the conformal structure 704 can be applied to, or incorporated into, a 3D object model 115 that is to be implemented in an additive manufacturing device such as 3D printing system 200 to form or print a physical object that incorporates the conformal structure 704.

Referring again to FIG. 2 as noted above, in addition to enabling the generation of such a conformal structure 704, 113, the 3D printing system 200 provides an example of an additive manufacturing device that is capable of fabricating an object from a 3D object model 115 that incorporates such a conformal structure, whether the conformal structure and 3D object model are generated on the 3D printing system 200 itself, or on an external computing device such as a computing system 100, a CAD system, or the like. In general, a 3D object model 115 incorporating a conformal structure 113 can be processed into 2D sliced data that can be rendered by a processor 104 executing instructions from a render module 118. A render module 118 can facilitate the generation of 3D printer system commands that can control components of the 3D printing system 200 to print each layer of a part according to the 2D slice data, where each 2D data slice comprises a cross-sectional area of the 3D object model 115. Thus, the 3D printing system 200 can print a 3D object based on a 3D object model 115 that incorporates a conformal structure 113 generated as discussed herein above. In addition, the illustration in FIG. 2 of the 3D printing system and its related description are not intended to limit the extent to which alternate additive manufacturing systems may be suitable for implementing the generation and fabrication of conformal structures as disclosed herein. Thus, in other examples, additive manufacturing systems may be implemented as devices other than the described 3D printing system 200. Such devices may include, for example, SLS (selective laser sintering) devices, SLA (stereolithography) devices, and FDM (fused deposition modeling) devices.

To this end, the controller 102 of 3D printing system 200 additionally facilitates operations of the system 200 for printing (i.e., generating, fabricating) 3D objects according to a 3D object model, including controllably spreading powder or other type of build material onto a print bed 120, selectively applying fusing agent and detailing agent to portions of the powder, and exposing the powder to radiation R. The example 3D printing system 200 of FIG. 2 thus comprises various components of a print engine that can fabricate a 3D object, the components including a moveable print bed 120, a build area 122, a powdered build material distributor 124, a liquid agent dispenser 126, and a fusing energy source 132.

A moveable print bed 120, or build platform 120 can serve as the floor of a work space or build area 122 in which 3D objects can be generated. In some examples the print bed 120 can move in a vertical direction (i.e., up and down) in the z-axis direction. The build area 122 generally comprises a build volume that develops over the print bed 120 as the print bed moves downward during the layer-by-layer printing and solidification of a 3D object. A powdered build material distributor 124 can provide a layer of powder over the print bed 120. A suitable powdered build material can include, for example, polyamides (e.g., PA11, PA12), polyurethanes (e.g., TPU), polypropylenes or any other suitable polymeric build material. In some examples, the build material may be a metallic (e.g., stainless steel) or ceramic build material. The powder distributor 124 can include a powder supply and powder spreading mechanism such as a roller or blade to move across the print bed 120 in the x-axis direction to spread a layer of powder.

A liquid agent dispenser 126 can deliver a liquid functional agent such as a fusing agent and/or detailing agent from a fusing agent dispenser 126a and detailing agent dispenser 126b, respectively, in a selective manner onto areas of a powder layer provided on the print bed 120. In some examples a suitable fusing agent can include an ink-type formulation comprising carbon black. In different examples, fusing agent formulations can also comprise an infra-red light absorber, a near infra-red light absorber, a visible light absorber, and a UV light absorber. Inks comprising visible light enhancers can include dye based colored ink and pigment based colored ink. Liquid agent dispensers 126 can include, for example, a printhead or printheads, such as thermal inkjet or piezoelectric inkjet printheads. In some examples, a printhead dispenser 126 can comprise a pagewide array of liquid ejectors (i.e., nozzles) that spans across the full y-axis dimension of the print bed 120 and moves bi-directionally (i.e., back and forth) in the x-axis as indicated by direction arrow 128 while it ejects liquid droplets onto a powder layer spread over the print bed 120. In other examples, a printhead dispenser 126 can comprise a scanning type printhead. A scanning type printhead can span across a limited portion or swath of the print bed 120 in the y-axis dimension as it moves bi-directionally in the x-axis as indicated by direction arrow 128, while ejecting liquid droplets onto a powder layer spread over the print bed 120. Upon completing each swath, a scanning type printhead can move in the y-axis direction as indicated by direction arrow 130 in preparation for printing another swath of the powder layer on print bed 120.

The example 3D printing system 200 also includes a fusing energy source 132, such as radiation source 132, that can apply radiation R to powder layers on the print bed 120 to facilitate the heating and fusing of the powder. In some examples, the energy source 132 can comprise a scanning energy source that scans across the print bed 120 in the x-axis direction. In some examples, where a 3D printing system comprises a binder jetting system that can print a liquid binder agent onto different materials such as metals, ceramics, and plastics, for example, the system 200 can include a binder agent drying/curing unit (not shown).

Figure 8:
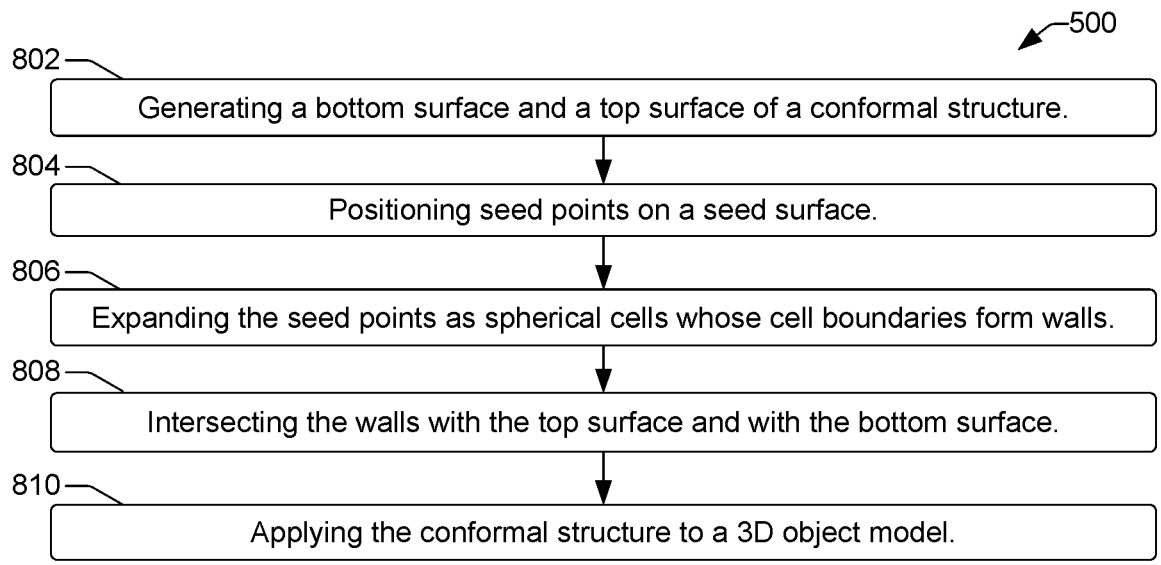
FIGS. 8 and 9 (FIGS. 9a and 9b) are flow diagrams showing example methods of generating a conformal structure.
Figure 9A:
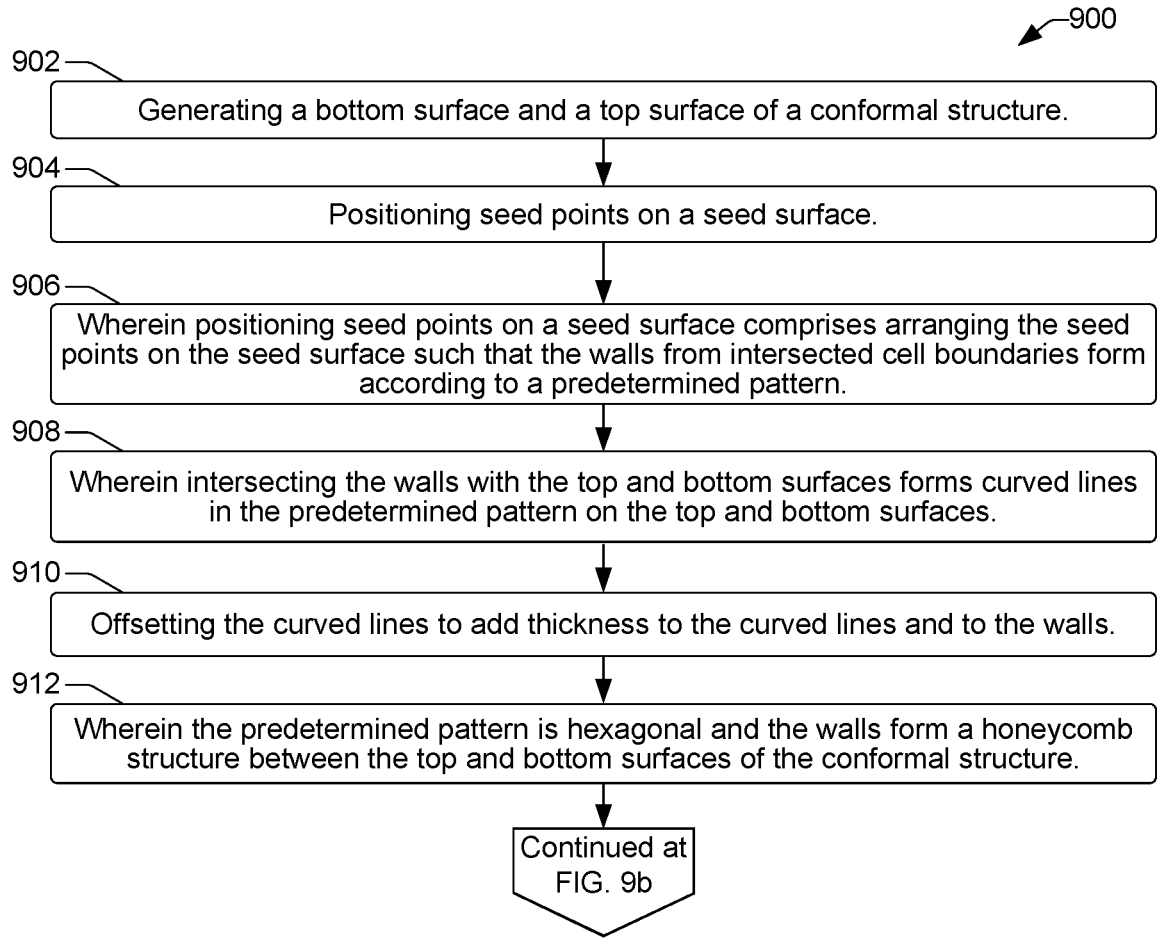
Figure 9B:
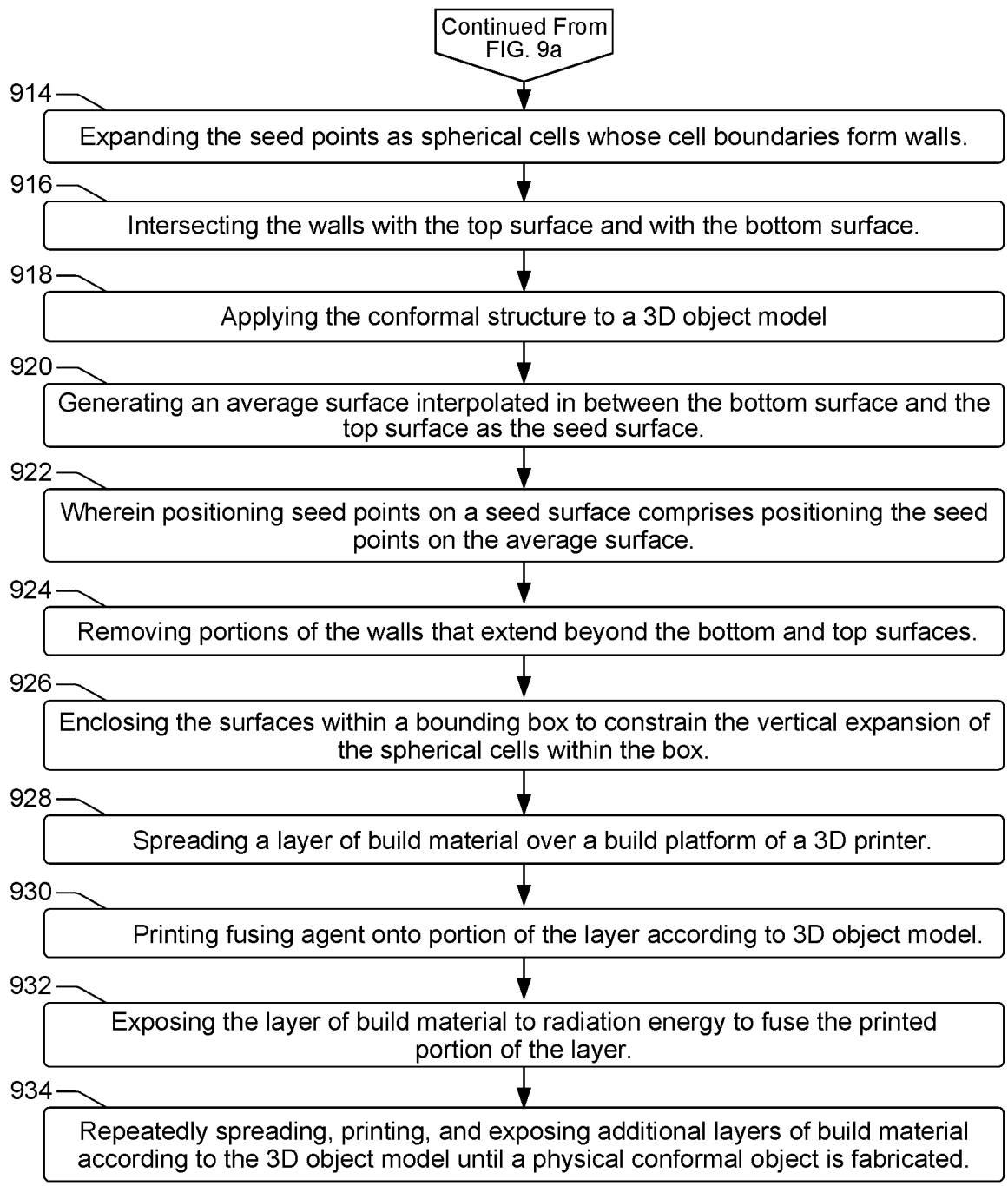

FIGS. 8 and 9 (FIGS. 9a and 9b) are flow diagrams showing example methods 800 and 900 of generating a conformal structure. Method 900 comprises extensions of method 800 and incorporates additional details of method 800. Methods 800 and 900 are associated with examples discussed above with regard to FIGS. 1-7, and details of the operations shown in methods 800 and 900 can be found in the related discussion of such examples. The operations of methods 800 and 900 may be embodied as programming instructions stored on a non-transitory, machine-readable (e.g., computer/processor-readable) medium, such as memory/storage 106 shown in FIGS. 1 and 2. In some examples, implementing the operations of methods 800 and 900 can be achieved by a controller, such as a controller 102 of FIGS. 1 and 2, reading and executing the programming instructions stored in a memory 106. In some examples, implementing the operations of methods 800 and 900 can be achieved using an ASIC and/or other hardware components alone or in combination with programming instructions executable by a controller 102.

The methods 800 and 900 may include more than one implementation, and different implementations of methods 800 and 900 may not employ every operation presented in the respective flow diagrams of FIGS. 8 and 9 (FIGS. 9a and 9b). Therefore, while the operations of methods 800 and 900 are presented in a particular order within their respective flow diagrams, the order of their presentations is not intended to be a limitation as to the order in which the operations may actually be implemented, or as to whether all of the operations may be implemented. For example, one implementation of method 800 might be achieved through the performance of a number of initial operations, without performing other subsequent operations, while another implementation of method 800 might be achieved through the performance of all of the operations.

Referring now to the flow diagram of FIG. 8, an example method 800 of generating a conformal structure begins at block 802 with generating a bottom surface and a top surface of a conformal structure. The method also includes positioning seed points on a seed surface (block 804). In some examples, the seed surface comprises the bottom surface or the top surface. The seed points can then be expanded as spherical cells (block 806). The spherical cell can form walls perpendicular to the surfaces as the cell boundaries intersect with cell boundaries of neighboring spherical cells. The method also includes intersecting the walls with the top surface as the cells expand vertically upward from the seed surface, and intersecting the walls with the bottom surface as the cells expand vertically downward from the seed surface (block 808). The bottom surface, the top surface, and portions of the walls in between the bottom and top surfaces comprise the conformal structure. The conformal structure can then be applied to a 3D object model for subsequent fabrication in an additive manufacturing device (block 810).

Referring now to the flow diagram of FIGS. 9*a* and 9*b*, another example method 900 of generating a conformal structure begins at block 902 with generating a bottom surface and a top surface of a conformal structure. The method continues with positioning seed points on a seed surface (block 904). In some examples, positioning seed points on a seed surface comprises arranging the seed points on the seed surface such that the walls from intersected cell boundaries form according to a predetermined pattern (block 906). In some examples, intersecting the walls with the top and bottom surfaces forms curved lines in the predetermined pattern on the top and bottom surfaces (block 908). The method can include offsetting the curved lines to add thickness to the curved lines and to the walls (block 910). In some examples, the predetermined pattern can be hexagonal and the walls can form a honeycomb structure between the top and bottom surfaces of the conformal structure (block 912).

The method 900 then continues at FIG. 9*b* with expanding the seed points as spherical cells whose cell boundaries form walls (block 914), intersecting the walls with the top surface and with the bottom surface (block 916), and applying the conformal structure to a 3D object model (block 918). In some examples, the method includes generating an average surface interpolated in between the bottom surface and the top surface as the seed surface (block 920), and positioning seed points on a seed surface comprises positioning the seed points on the average surface (block 922). The method can also include removing portions of the walls that extend beyond the bottom and top surfaces (block 924) and enclosing the surfaces within a bounding box to constrain the vertical expansion of the spherical cells within the box (block 926). The method 900 can also include operations to fabricate a physical 3D object that includes the conformal structure. For example, the method 900 can include spreading a layer of build material over a build platform of a 3D printer (block 928), printing a fusing agent onto a portion of the layer according to the 3D object model (block 930), exposing the layer of build material to radiation energy to fuse the printed portion of the layer (block 932), and repeatedly spreading, printing, and exposing additional layers of build material according to the 3D object model until a physical conformal object is fabricated (block 934).

What is claimed is:

1. A method comprising:
generating, by a processor, a three-dimensional (3D) object model of a conformal structure to include within a 3D object model of a part to be fabricated via additive manufacturing using an additive manufacturing apparatus, the part having bottom and top curved surfaces, wherein generating the 3D object model of the conformal structure comprises:
generating bottom and top curved surfaces of the conformal structure that correspond to the bottom and top curved surfaces of the part;
positioning seed points on a seed surface corresponding to the top curved surface of the conformal structure, the bottom curved surface of the conformal structure, or a surface between the bottom and top curved surfaces of the conformal structure;
three-dimensionally expanding the seed points as spheres until each sphere intersects with neighboring spheres, such that geodesics joining intersections of neighboring spheres along the seed surface correspond to walls of cells; and
normally extending the walls of the cells from the seed surface until the walls fully intersect the bottom and top curved surfaces of the conformal structure;
modifying, by the processor, the 3D object model of the part to be fabricated to include the 3D object model of the conformal structure between the bottom and top curved surfaces of the part; and
causing the additive manufacturing apparatus to fabricate the part in accordance with the 3D object model of the part as has been modified,
wherein the additive manufactured apparatus fabricates the part in accordance with the object model of the part as has been modified by, on a layer-by-layer basis:
spreading a layer of build material over a build platform; and
selectively solidifying a portion of the layer in accordance with the 3D object model of the part as has been modified.

2. The method of claim 1, wherein generating the 3D object model of the conformal structure further comprises:
generating an average surface interpolated between the bottom surface and top surfaces of the conformal structure as the seed surface,
wherein normally extending the walls of the cells from the seed surface comprises normally extending the walls both above and below the seed surface until the walls fully intersect the bottom and top curved surfaces of the conformal structure.

3. The method of claim 1, wherein generating the 3D object model of the conformal structure further comprises:
removing portions of the walls that extend beyond the bottom and top curved surfaces of the conformal structure.

4. The method of claim 1, wherein positioning the seed points on the seed surface comprises arranging the seed points on the seed surface such that the geodesics joining the intersections of the neighboring spheres are formed according to a predetermined pattern.

5. The method of claim 4, wherein the predetermined pattern comprises a hexagonal pattern and the cells form a honeycomb structure between the bottom and top curved surfaces of the conformal structure.

6. The method of claim 1, wherein generating the 3D object model of the conformal structure further comprises:
selecting the bottom curved surface of the conformal structure as the seed surface,
wherein normally extending the walls of the cells from the seed surface comprises normally extending the walls above the seed surface until the walls fully intersect the top curved surface of the conformal structure.

7. The method of claim 1, wherein generating the 3D object model of the conformal structure further comprises:
selecting the top curved surface of the conformal structure as the seed surface,
wherein normally extending the walls of the cells from the seed surface comprises normally extending the walls below the seed surface until the walls fully intersect the bottom curved surface of the conformal structure.

8. A non-transitory computer-readable medium storing instructions executable by a processor to perform processing comprising:
generating a three-dimensional (3D) object model of a conformal structure to include within a 3D object model of a part to be fabricated via additive manufacturing using an additive manufacturing apparatus, the part having bottom and top curved surfaces, wherein generating the 3D object model of the conformal structure comprises:
- generating bottom and top curved surfaces of the conformal structure that correspond to the bottom and top curved surfaces of the part;
- positioning seed points on a seed surface corresponding to the top curved surface of the conformal structure, the bottom curved surface of the conformal structure, or a surface between the bottom and top curved surfaces of the conformal structure;
- three-dimensionally expanding the seed points as spheres until each sphere intersects with neighboring spheres, such that geodesics joining intersections of neighboring spheres along the seed surface correspond to walls of cells; and
- normally extending the walls of the cells from the seed surface until the walls fully intersect the bottom and top curved surfaces of the conformal structure;
- modifying the 3D object model of the part to be fabricated to include the 3D object model of the conformal structure between the bottom and top curved surfaces of the part; and
- causing the additive manufacturing apparatus to fabricate the part in accordance with the 3D object model of the part as has been modified,
- wherein the additive manufactured apparatus fabricates the part in accordance with the object model of the part as has been modified by, on a layer-by-layer basis:
- spreading a layer of build material over a build platform; and
- selectively solidifying a portion of the layer in accordance with the 3D object model of the part as has been modified.

9. The non-transitory computer-readable medium of claim 8, wherein generating the 3D object model of the conformal structure further comprises:
- generating an average surface interpolated between the bottom surface and top surfaces of the conformal structure as the seed surface,
- wherein normally extending the walls of the cells from the seed surface comprises normally extending the walls both above and below the seed surface until the walls fully intersect the bottom and top curved surfaces of the conformal structure.

10. The non-transitory computer-readable medium of claim 8, wherein generating the 3D object model of the conformal structure further comprises:
- removing portions of the walls that extend beyond the bottom and top curved surfaces of the conformal structure.

11. The non-transitory computer-readable medium of claim 8, wherein positioning the seed points on the seed surface comprises arranging the seed points on the seed surface such that the geodesics joining the intersections of the neighboring spheres are formed according to a predetermined pattern.

12. The non-transitory computer-readable medium of claim 11, wherein the predetermined pattern comprises a hexagonal pattern and the cells form a honeycomb structure between the bottom and top curved surfaces of the conformal structure.

13. The non-transitory computer-readable medium of claim 8, wherein generating the 3D object model of the conformal structure further comprises:
- selecting the bottom curved surface of the conformal structure as the seed surface,
- wherein normally extending the walls of the cells from the seed surface comprises normally extending the walls above the seed surface until the walls fully intersect the top curved surface of the conformal structure.

14. The non-transitory computer-readable medium of claim 8, wherein generating the 3D object model of the conformal structure further comprises:
- selecting the top curved surface of the conformal structure as the seed surface,
- wherein normally extending the walls of the cells from the seed surface comprises normally extending the walls below the seed surface until the walls fully intersect the bottom curved surface of the conformal structure.

* * * * *